United States Patent
Zhong (10) Patent No.: US 12,475,319 B2
(45) Date of Patent: Nov. 18, 2025

(54) METHOD OF DISPATCHING POWER, ELECTRONIC DEVICE, AND STORAGE MEDIUM

(71) Applicant: BEIJING BAIDU NETCOM SCIENCE TECHNOLOGY CO., LTD., Beijing (CN)

(72) Inventor: Xia Zhong, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 378 days.

(21) Appl. No.: 18/087,184

(22) Filed: Dec. 22, 2022

(65) Prior Publication Data

US 2023/0130771 A1    Apr. 27, 2023

(30) Foreign Application Priority Data

Dec. 24, 2021    (CN) .......................... 202111605254.2

(51) Int. Cl.
*G06F 17/00*    (2019.01)
*G06F 40/30*    (2020.01)

(52) U.S. Cl.
CPC .................... *G06F 40/30* (2020.01)

(58) Field of Classification Search
USPC ............................................................ 704/9
See application file for complete search history.

(56) References Cited

U.S. PATENT DOCUMENTS

| 2020/0118223 A1* | 4/2020 | Singh ...................... G06Q 50/06 |
| 2021/0042372 A1* | 2/2021 | Huang .................... G06N 20/00 |
| 2021/0216545 A1* | 7/2021 | Fusco ................ G06F 16/2474 |
| 2022/0231504 A1* | 7/2022 | Zeng ......................... H02J 3/06 |

FOREIGN PATENT DOCUMENTS

| CN | 107679147 | 2/2018 |
| CN | 110277086 | 9/2019 |
| CN | 112581964 | 3/2021 |

(Continued)

OTHER PUBLICATIONS

European Search Report issued in corresponding European Patent Application No. 22216159.8, dated May 23, 2023.

(Continued)

*Primary Examiner* — Satwant K Singh
(74) *Attorney, Agent, or Firm* — Pillsbury Winthrop Shaw Pittman, LLP (57) ABSTRACT

A method of dispatching power, an electronic device, and a storage medium, which relate to a field of artificial intelligence technology, and in particular to technical fields such as natural language processing and knowledge graph. The method includes: acquiring a power dispatching question information; determining a question semantic information corresponding to the power dispatching question information, wherein the question semantic information includes an identification of a target substation, a question intention, and a target parameter; and determining an answer information according to the question semantic information and a preset rule base, and outputting the answer information, wherein the answer information is used for a power dispatching of the target substation.

20 Claims, 7 Drawing Sheets

(56) References Cited

FOREIGN PATENT DOCUMENTS

| | | |
|---|---|---|
| CN | 112599124 | 4/2021 |
| CN | 112632288 | 4/2021 |
| CN | 113609264 | 11/2021 |
| CN | 113689851 | 11/2021 |
| KR | 20180116726 | 10/2018 |

OTHER PUBLICATIONS

Y. Tang et al., "An Intelligent Question Answering System based on Power Knowledge Graph", 2021 IEEE Power & Energy Society General Meeting (PESGM), IEEE, pp. 1-5 (Jul. 26, 2021).
Chinese Office Action and Search Report issued in corresponding Chinese Patent Application No. 202111605254.2, dated Oct. 13, 2022.

\* cited by examiner

METHOD OF DISPATCHING POWER, ELECTRONIC DEVICE, AND STORAGE MEDIUM

This application claims priority to Chinese Patent Application No. 202111605254.2, filed on Dec. 24, 2021, which is incorporated herein in its entirety by reference.

TECHNICAL FIELD

The present disclosure relates to technical fields such as natural language processing and knowledge graph in a field of artificial intelligence technology, and in particular, to a method of dispatching power, an electronic device, and a storage medium.

BACKGROUND

In a power system, in order to ensure that a substation can reliably supply power to outside, it is necessary to perform power dispatching on the substation.

In general, when performing power dispatching, a dispatcher is required to manually check an operation parameter of each power device in the substation, and manually determine an operation state of the substation based on a power knowledge and an experience mastered by the dispatcher. Then, a dispatching mode for the substation is determined manually based on the dispatcher's own dispatching knowledge and experience.

SUMMARY

The present disclosure provides a method of dispatching power, an electronic device, and a storage medium.

According to an aspect of the present disclosure, a method of dispatching power is provided, including: acquiring a power dispatching question information; determining a question semantic information corresponding to the power dispatching question information, wherein the question semantic information includes an identification of a target substation, a question intention, and a target parameter; and determining an answer information according to the question semantic information and a preset rule base, and outputting the answer information, wherein the answer information is used for a power dispatching of the target substation.

According to an aspect of the present disclosure, an electronic device is provided, including: at least one processor; and a memory communicatively connected to the at least one processor, wherein the memory stores instructions executable by the at least one processor, and the instructions, when executed by the at least one processor, are configured to cause the at least one processor to implement the method described in the first aspect.

According to an aspect of the present disclosure, a non-transitory computer-readable storage medium having computer instructions therein is provided, wherein the computer instructions are configured to cause a computer system to implement the method described in the first aspect.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

Figure 1:
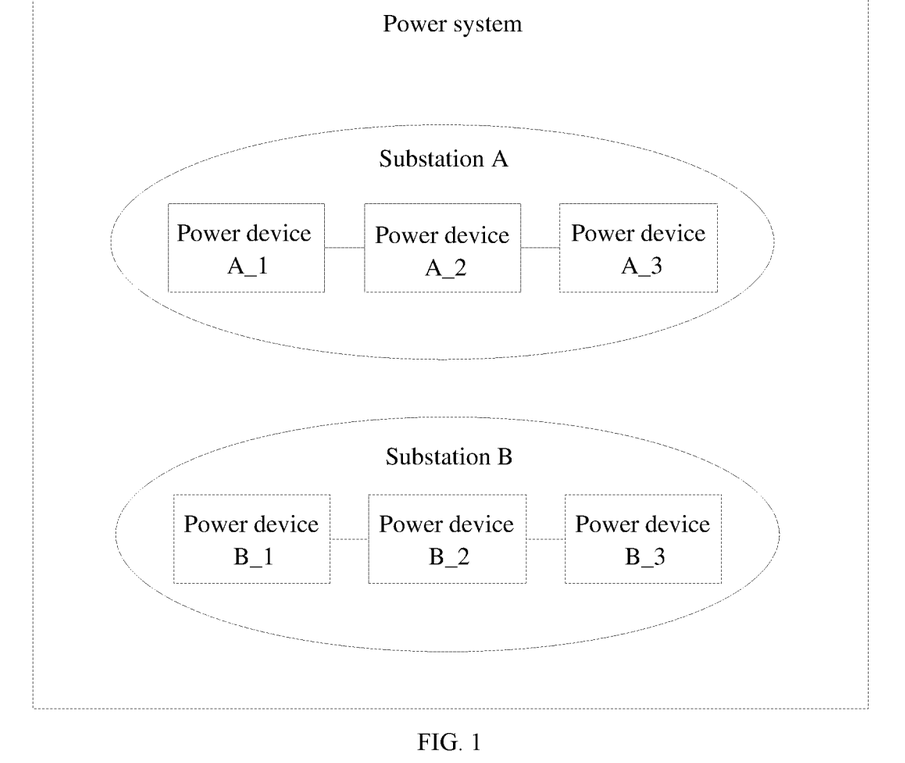
FIG. 1 shows a schematic diagram of a power system provided by embodiments of the present disclosure.

For ease of understanding, concepts and terms involved in embodiments of the present disclosure are first explained in combination with a power system shown in FIG. 1.

FIG. 1 shows a schematic diagram of a power system provided by embodiments of the present disclosure. As shown in FIG. 1, the power system may include at least one substation. The substation refers to a place where a voltage and a current are transformed, and where an electric energy is received and distributed. A substation in a power plant is a step-up substation, and a function of the step-up substation is to boost a power generated by a generator and feed a boosted power to a high-voltage grid.

With continued reference to FIG. 1, every substation may include at least one power device. The power device may be divided into a primary device and a secondary device. The primary device refers to a device that directly produces, transmits, distributes and uses the electric energy, mainly including a transformer, a high-voltage circuit breaker, a disconnector, a bus, a lightning arrester, a capacitor, an electric reactor, and the like. The secondary device refers to a device that measures, monitors, controls and protects an operation condition of the primary device and system, mainly including a relay protection apparatus, an automatic apparatus, a measurement and control apparatus, a metering apparatus, an automation system, and a DC device that provides a power for the secondary device.

It may be understood that a plurality of power devices in the same substation in the power system may be electrically connected to each other. For different application scenarios, a connection relationship between power devices may be different, which is not limited in this embodiment. A connection relationship shown in FIG. 1 is only an example.

In the power system, in order to ensure that a substation can reliably supply power to outside, it is necessary to perform power dispatching on the substation. As described above, when performing power dispatching, a dispatcher is required to manually check an operation parameter of each power device in the substation, and manually determine an operation state of the substation based on a power knowledge and an experience mastered by the dispatcher. Then, a dispatching mode for the substation is determined manually based on the dispatcher's own dispatching knowledge and experience.

The above-mentioned method of determining the mode of dispatching power is purely manual, so that an efficiency of dispatching power is relatively low. Moreover, it is required to rely on the knowledge and experience mastered by the dispatcher, which cannot guarantee an accuracy of a dispatching result. When replacing the dispatcher, an old dispatcher transfers his/her knowledge and experience to a new dispatcher by word of mouth. An error may occur in such process, so that the knowledge and experience cannot be completely and accurately inherited.

The present disclosure provides a method and an apparatus of dispatching power, a device, a storage medium, and a program, which is applied to technical fields such as natural language processing and knowledge graph in the field of artificial intelligence technology, so as to improve the efficiency of dispatching power and the accuracy of the dispatching result.

Figure 2:
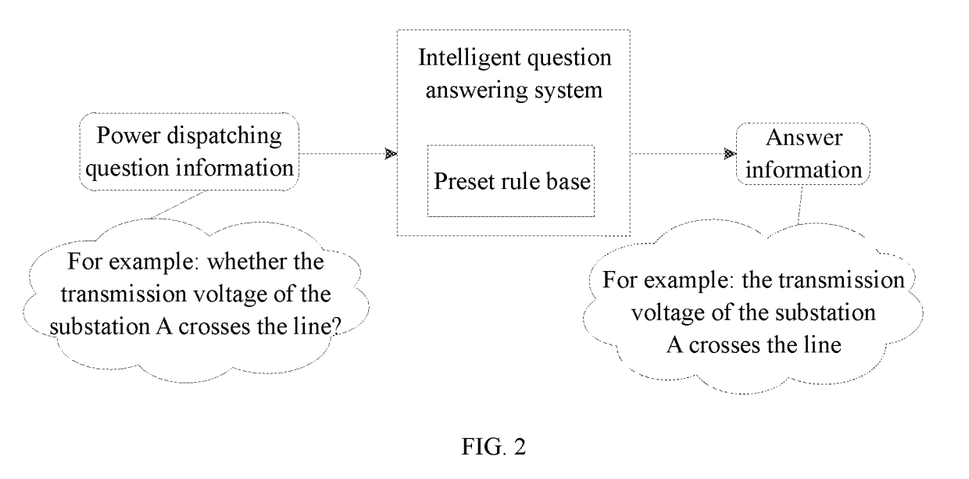
FIG. 2 shows a schematic diagram of an implementation principle of power dispatching provided by embodiments of the present disclosure.

FIG. 2 shows a schematic diagram of an implementation principle of power dispatching provided by embodiments of the present disclosure. In the present disclosure, an intelligent question answering system may be applied to the power system. The intelligent question answering system may be deployed into an electronic device. The electronic device may be a terminal device or a server. As shown in FIG. 2, when power dispatching is required, a power dispatching question information may be input into the intelligent question answering system by a user (such as the dispatcher). The intelligent question answering system recognizes and obtains a question semantic information corresponding to the power dispatching question information. Furthermore, the intelligent question answering system determines an answer information according to the question semantic information and a preset rule base, and outputs the answer information. In this way, the user may conduct power dispatching according to the answer information.

For example, as shown in FIG. 2, if a question "Whether a voltage of a substation A crosses a line (or exceeds a limit)" is input into the intelligent question answering system by the user, the intelligent question answering system may output an answer "The voltage of the substation A crosses the line".

In the technical solution of the present disclosure, the user only needs to input the power dispatching question information to the question answering system, and does not need to manually check the operation parameter of each power device, nor does it need to carry out a manual reasoning process, which improves the efficiency of power dispatching. In addition, an entire power dispatching process does not rely on the user's own knowledge and experience by deploying the preset rule base into the intelligent question answering system, which improves the accuracy of the power dispatching result. There is no need to pass on knowledge and experience by word of mouth between new and old dispatchers, which ensures the inheritance of the knowledge and experience.

The technical solution provided by the present disclosure is described in detail below with specific embodiments. The following specific embodiments may be combined with each other. For the same or similar probability or process, it may not be repeated in some embodiments.

Figure 3:
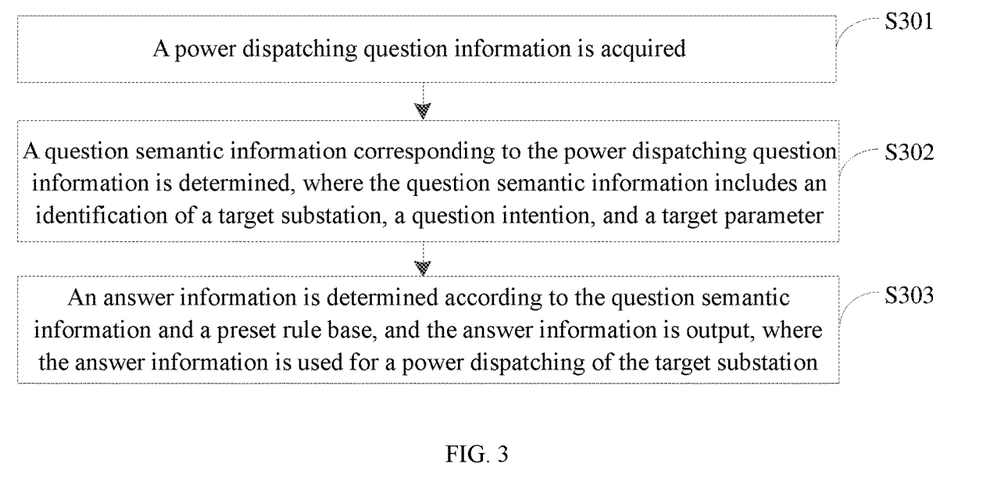
FIG. 3 shows a schematic flowchart of a method of dispatching power provided by embodiments of the present disclosure.

FIG. 3 shows a schematic flowchart of a method of dispatching power provided by embodiments of the present disclosure. As shown in FIG. 3, the method provided by this embodiment includes operations S301 to S303.

In operation S301, a power dispatching question information is acquired.

The power dispatching question information may refer to a question input to the intelligent question answering system by the user (such as the dispatcher) to determine a dispatching mode of a certain substation. The power dispatching question information may be in a form of text or voice, which is not limited in this embodiment.

In an example, the power dispatching question information may be a question for asking whether a certain dispatching mode is feasible or not. For example, "Is it OK to adjust a transmission voltage of the substation A to 300 kV?"

In another example, the power dispatching question information may also be a question for asking an operation state of the substation. For example, "Whether the transmission voltage of the substation A crosses the line?"

In operation S302, a question semantic information corresponding to the power dispatching question information is determined, wherein the question semantic information includes an identification of a target substation, a question intention, and a target parameter.

In this embodiment, after acquiring the power dispatching question information, the intelligent question answering system may perform a natural language processing on the power dispatching question information, so as to obtain the question semantic information corresponding to the power dispatching question information.

The question semantic information includes the identification of the target substation, the question intention, and the target parameter. The identification of the target substation is used to indicate which substation needs to be dispatched. The target parameter is used to indicate which parameter is needed to be based on to dispatch the substation. The question intention is used to indicate a purpose of the inquiry.

In a possible implementation, the power dispatching question information may be processed by a preset model to obtain the question semantic information. The preset model may be a network model obtained by pre-training using a machine learning method. This embodiment does not limit a network structure of the preset model, for example, the preset model may be a convolutional neural network model.

The preset model is obtained by training sample data. The sample data includes a sample question information and a sample semantic information. In a training process, the sample question information is input into a preset model to be trained, and the preset model processes the sample question information to obtain a predicted semantic information. A loss function is calculated according to the predicted semantic information and the sample semantic information. A parameter of the preset model is adjusted according to the loss function. The above process is repeated until a preset number of iterations or a convergence condition of the preset model is reached. Accordingly, a trained preset model is obtained.

For example, if the power dispatching question information is "Whether the transmission voltage of the substation A crosses the line?", then following question semantic information: the identification of the target substation is "substation A", the target parameter is "transmission voltage", and the question intention is "whether it crosses the line" may be obtained after semantic recognition of this power dispatching question information.

For example, if the power dispatching question information is "Is it OK to adjust a transmission voltage of the substation A to 300 kV?", then following question semantic information: the identification of the target substation is "substation A", the target parameter is "transmission voltage", and the question intention is "can it be adjusted to 300 kV" may be obtained after semantic recognition of this power dispatching question information.

Figure 4:
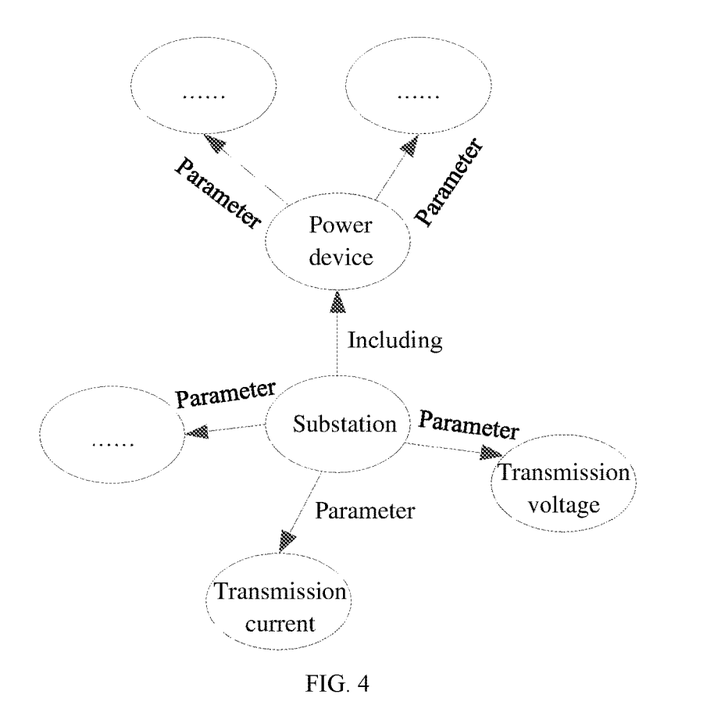
FIG. 4 shows a schematic diagram of a knowledge graph provided by embodiments of the present disclosure.

In some possible implementations, a knowledge graph may be used in the process of semantic recognition. As an example, FIG. 4 shows a schematic diagram of a knowledge graph provided by embodiments of the present disclosure. As shown in FIG. 4, the knowledge graph shows that the substation includes the power device, parameters of the substation include a transmission voltage, a transmission current, etc., and parameters of the power device include a parameter 1 and a parameter 2.

When performing semantic recognition on the power dispatching question information, an entity information recognition may be performed on the power dispatching question information. For example, recognized entities include "substation A" and "transmission voltage". Combined with the knowledge graph, it may be determined that "substation A" is the identification of the target substation and "transmission voltage" is the target parameter. Further, an intention recognition is performed on the power dispatching question information, so as to obtain that the question intention is "whether it crosses the line".

In operation S303, an answer information is determined according to the question semantic information and a preset rule base, and the answer information is output, wherein the answer information is used for a power dispatching of the target substation.

In this embodiment, the preset rule base is used to store a plurality of rules. These rules are usually the knowledge or experience required in the power dispatching process. For example, what is a limit for a certain parameter of a certain substation? etc.

In an example, the content of the preset rule base may be as shown in Table 1.

TABLE 1

| Identification of the substation | Content of the rule |
|---|---|
| Substation A | Rule A1: A limit for a parameter 1 is x1 |
| | Rule A2: A limit for a parameter 2 is x2 |
| | ... |

TABLE 1-continued

| Identification of the substation | Content of the rule |
|---|---|
| Substation B | Rule B1: A limit for a parameter 1 is x1 |
| | Rule B2: A limit for a parameter 2 is x2 |
| | ... |

It may be seen that, in embodiments of the present disclosure, the knowledge and experience of the dispatcher are deployed in the intelligent question answering system in a form of a rule base, so that the intelligent question answering system may use the rule base to reason and analyze the power dispatching question information, thus obtaining the answer information.

It should be noted that the rules illustrated in Table 1 are only some examples. This embodiment does not limit the content of the rules, as long as the knowledge and experience required in the power dispatching process can be deployed into the rule base.

In this embodiment, according to the question semantic information, the intelligent question answering system may output the answer information after using the preset rule base for reasoning and analyzing to obtain the answer information. In this way, the user may perform power dispatching according to the answer information. For example, if for the power dispatching question information "Whether the transmission voltage of the substation A crosses the line" input by the user, the answer information output by the intelligent question answering system is "the transmission voltage of the substation A crosses the line", then the user may determine a specific dispatching mode based on the answer information. For another example, if for the power dispatching question information "Is it OK to adjust the transmission voltage of substation A to 300 kV" input by the user, the answer information output by the intelligent question answering system is "Yes", then the user may adjust the transmission voltage of the substation A to 300 kV.

It should be understood that the intelligent question answering system in embodiments of the present disclosure may be deployed in a terminal device, and may also be deployed in a server. When the intelligent question answering system is deployed in the terminal device, the power dispatching question information may be input by the user through the terminal device, and the terminal device may reason the power dispatching question information by using the intelligent question answering system so as to obtain the answer information. The terminal device may display the answer information. When the intelligent question answering system is deployed in the server, the power dispatching question information may be input by the user through the terminal device. The terminal device may send the power dispatching question information to the server, and the server may reason the power dispatching question information by using the intelligent question answering system so as to obtain the answer information. Further, the server sends the answer information to the terminal device so that the terminal device may display the answer information.

It should be noted that, in an application scenario of this embodiment, the intelligent question answering system is used as an assistant for power dispatching decision-making, that is, the intelligent question answering system may assist the user in making power decisions, and it is the user who actually control the dispatching of the substation. This is done because a dispatching management of the power system is more important. Once the dispatching is wrong, the power system may be paralyzed, which will have a serious impact on production and life. It may be understood that when the accuracy of the intelligent question answering system is improved to 100%, fully automatic dispatching control may be achieved.

The method of dispatching power provided in this embodiment includes: acquiring the power dispatching question information; determining the question semantic information corresponding to the power dispatching question information, where the question semantic information includes the identification of the target substation, the question intention, and the target parameter; and determining the answer information according to the question semantic information and the preset rule base, and outputting the answer information, where the answer information is used for the power dispatching of the target substation. In the above process, the user only needs to input the power dispatching question information to the question answering system, and does not need to manually check the operation parameter of each power device, nor does it need to carry out a manual reasoning process, which improves the efficiency of power dispatching. In addition, an entire power dispatching process does not rely on the user's own knowledge and experience by deploying the preset rule base into the intelligent question answering system, which improves the accuracy of the power dispatching result.

On the basis of the embodiment shown in FIG. 3, the technical solution of the present disclosure will be described in more detail in combination with a specific embodiment.

Figure 5:
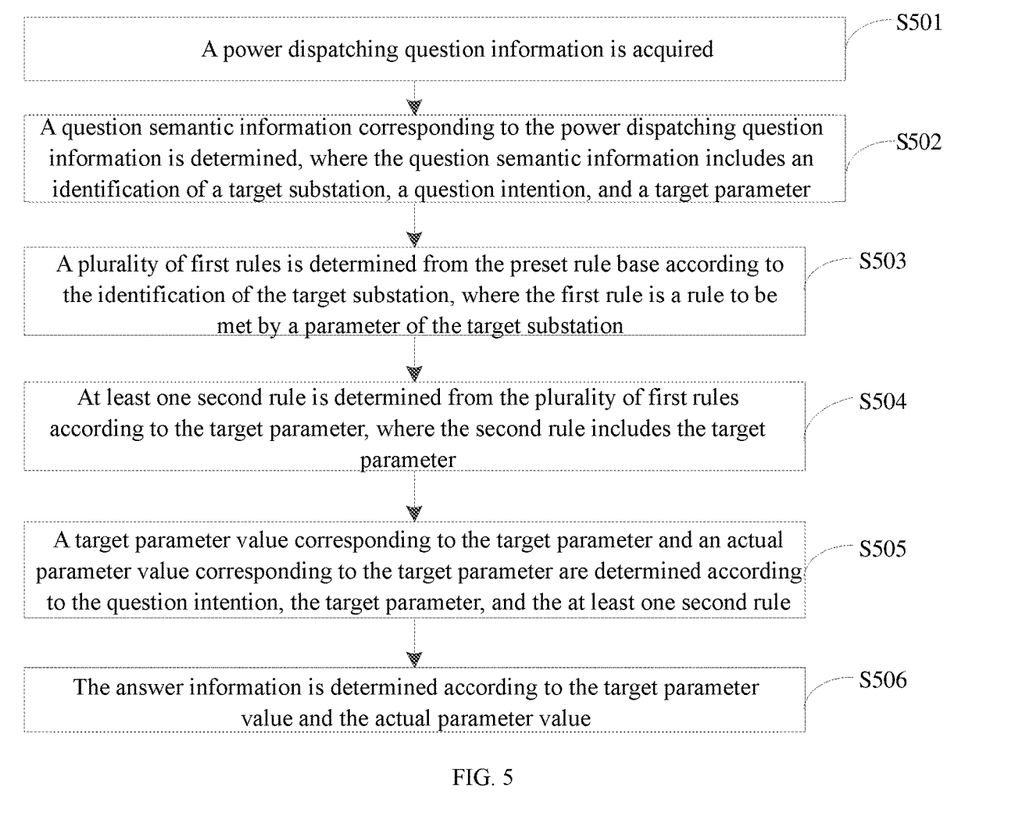
FIG. 5 shows a schematic flowchart of another method of dispatching power provided by embodiments of the present disclosure.

FIG. 5 shows a schematic flowchart of another method of dispatching power provided by embodiments of the present disclosure. As shown in FIG. 5, a method of this embodiment includes operations S501 to S506.

In operation S501, a power dispatching question information is acquired.

In operation S502, a question semantic information corresponding to the power dispatching question information is determined, where the question semantic information includes an identification of a target substation, a question intention, and a target parameter.

It should be understood that implementations of S501 and S502 in this embodiment are similar to those of S301 and S302 in the embodiment shown in FIG. 3, and will not be repeated here.

In operation S503, a plurality of first rules is determined from the preset rule base according to the identification of the target substation, where the first rule is a rule to be met by a parameter of the target substation.

In operation S504, at least one second rule is determined from the plurality of first rules according to the target parameter, where the second rule includes the target parameter.

An example is given below in combination with the preset rule base shown in Table 1. If the power dispatching question information is "Whether the transmission voltage of the substation A crosses the line", then following question semantic information: the identification of the target substation is "substation A", the target parameter is "transmission voltage", and the question intention is "whether it crosses the line" may be obtained after semantic recognition of this power dispatching question information.

According to the identification of the target substation "substation A", a plurality of first rules corresponding to the substation A may be determined in the preset rule base shown in Table 1, such as a rule A1, a rule A2, etc. Further, according to the target parameter "transmission voltage", it may be determined, for each first rule, whether that first rule includes "transmission voltage" or not. If that first rule includes the "transmission voltage", then that first rule is determined as the second rule, and if that first rule does not include "transmission voltage", then determining whether a next first rule includes "transmission voltage" or not. In this way, at least one second rule may be determined from the plurality of first rules described above, and the second rule includes "transmission voltage".

For ease of understanding, in this embodiment, a content of a determined second rule is "a limit for the transmission voltage is 240 kV".

In operation S505, a target parameter value corresponding to the target parameter and an actual parameter value corresponding to the target parameter are determined according to the question intention, the target parameter, and the at least one second rule.

In operation S506, the answer information is determined according to the target parameter value and the actual parameter value.

It should be understood that the question input by the user in embodiments of the present disclosure may be of a plurality of types. A mode of generating the answer information may be different for different types of questions. Two common question types are illustrated below.

In an application scenario of this embodiment, the user usually has the following two ways to ask questions.

The first way is to ask a current operation state of a certain substation, for example, "Whether the transmission voltage of the substation A crosses the line". In this way, the question intention is used to indicate an inquiry for a current operation state of the target substation.

The second way is to ask whether a dispatching mode is feasible for a certain substation, for example, "Is it OK to adjust the transmission voltage of the substation A to 300 kV". In this way, the question intention is used to indicate an inquiry for a dispatching mode of the target substation.

For the first way to ask a question, for example, "Whether the transmission voltage of the substation A crosses the line", the answer information may be determined by using the following method.

(1) The target parameter value corresponding to the target parameter is determined in the at least one second rule according to the target parameter. For example, taking the determination of one second rule as an example, if the content of the second rule is "the limit for the transmission voltage is 240 kV", then the target parameter value corresponding to the target parameter "transmission voltage" is determined as "240 kV".

(2) An operation parameter value of at least one power device in the target substation is acquired according to the target parameter, and the actual parameter value corresponding to the target parameter is determined according to the operation parameter value of the at least one power device. For example, the target substation A includes a plurality of power devices. Each power device may be connected with the intelligent question answering system. The intelligent question answering system may acquire the operation parameter value of each power device.

For example, if the target substation A includes three power devices. An operation parameter value of a transmission voltage of a power device A is 80 kV, an operation parameter value of a transmission voltage of a power device B is 80 kV, and an operation parameter value of a transmission voltage of a power device C is 90 kV. Accordingly, a sum of the operation parameter values of the transmission voltages of the above three power devices may be determined as the actual parameter value corresponding to the target parameter. That is, the actual parameter value corresponding to the target parameter "transmission voltage" is 250 kV.

(3) The answer information is determined according to the target parameter value and the actual parameter value.

If the actual parameter value is greater than the target parameter value, it indicates that the current operation state is abnormal, that is, there is a line crossing situation (or in other words, the limit has been exceeded). If the actual parameter value is less than or equal to the target parameter value, it indicates that the current operation state is normal, that is, there is no line crossing situation.

In the above example, as the actual parameter value of the transmission voltage is 250 kV and the target parameter value is 240 kV, it indicates that the transmission voltage of the substation A crosses the line. Therefore, the answer information "The transmission voltage of the substation A crosses the line" may be generated.

For the second way to ask a question, for example, "Is it OK to adjust the transmission voltage of the substation A to 300 kV", the answer information may be determined by using the following method.

(1) A parameter value is extracted from the power dispatching question information according to the target parameter, and the extracted parameter value is determined as the target parameter value corresponding to the target parameter. For example, a parameter value in "Is it OK to adjust the transmission voltage of the substation A to 300 kV" is extracted to obtain 300 kV. Therefore, the target parameter value corresponding to the target parameter "transmission voltage" is determined as "300 kV".

(2) The actual parameter value corresponding to the target parameter is determined in the at least one second rule. For example, taking the determination of one second rule as an example, if the content of the second rule is "the limit for the transmission voltage is 240 kV", then the actual parameter value corresponding to the target parameter "transmission voltage" is determined as "240 kV".

(3) The answer information is determined according to the target parameter value and the actual parameter value.

If the target parameter value is less than or equal to the actual parameter value, the inquired dispatching mode is feasible. If the target parameter value is greater than the actual parameter value, the inquired dispatching mode is not feasible.

In the above example, as the actual parameter value of the transmission voltage is 240 kV and the target parameter value is 300 kV, the inquired dispatching mode is not feasible. Therefore, the answer information "No" may be generated.

In operation S508, the answer information is output, where the answer information is used for a power dispatching of the target substation.

In this embodiment, at least one second rule may be determined from the preset rule base according to an identification of a target dispatching device and the target parameter, and the at least one second rule may be reasonably used for reasoning and analyzing according to the question intention, so as to obtain the answer information. A reasoning ability of the intelligent question answering system is improved, so that the intelligent question answering system may answer various types of questions.

On the basis of any of the above embodiments, the following describes an interaction process between the user and the intelligent question answering system with a specific example.

Figure 6A:
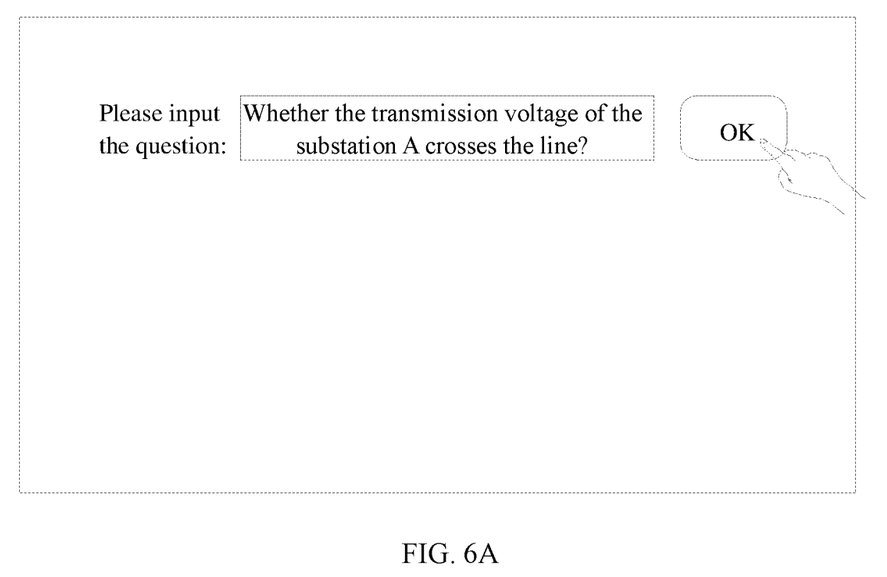
FIG. 6A and FIG. 6B show schematic diagrams of a display interface provided by embodiments of the present disclosure.
Figure 6B:
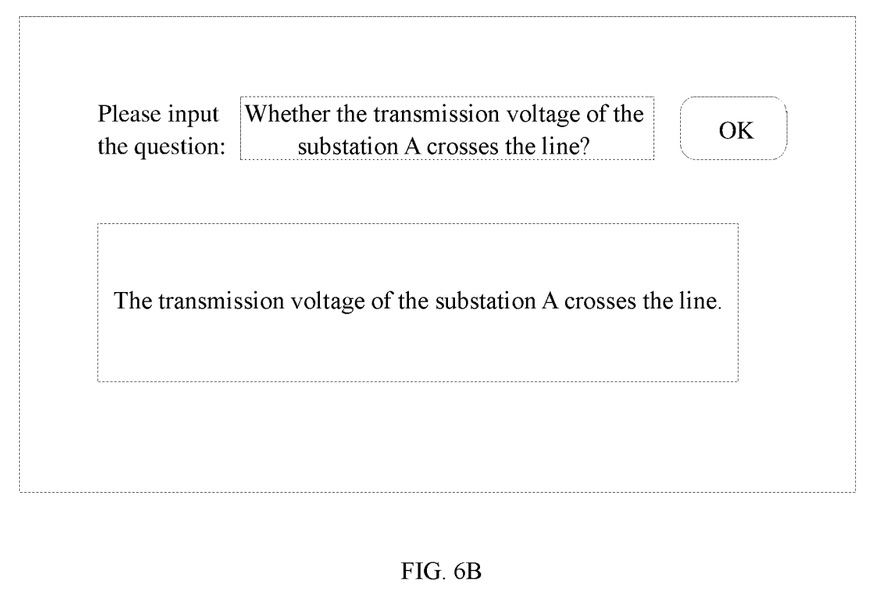

FIG. 6A-B show schematic diagrams of a display interface provided by embodiments of the present disclosure. As shown in FIG. 6A, the electronic device may display a first visual interface, where the first visual interface includes an input control. The user may input the power dispatching question information in the input control. For example, the power dispatching question information input by the user is "Whether the transmission voltage of the substation A crosses the line?". In response to an "OK" button being clicked by the user, the electronic device may receive the power dispatching question information input by the user through the input control. Further, the intelligent question answering system is used to perform a semantic recognition on the power dispatching question information to obtain the question semantic information, and the answer information is generated according to the question semantic information and the preset rule base. It should be understood that, for the process of generating the answer information, reference may be made to the detailed description of embodiments shown in FIG. 3 or FIG. 5.

If the answer information is "The transmission voltage of the substation A crosses the line", as shown in FIG. 6B, the first display interface may further include an answer display region. The electronic device may display the answer information in the answer display region.

Alternatively, when the electronic device displays the answer information, the electronic device may further display a rule applied in the reasoning process, and/or display a target parameter value and an actual parameter value that correspond to a target parameter applied in the reasoning process.

Figure 7:
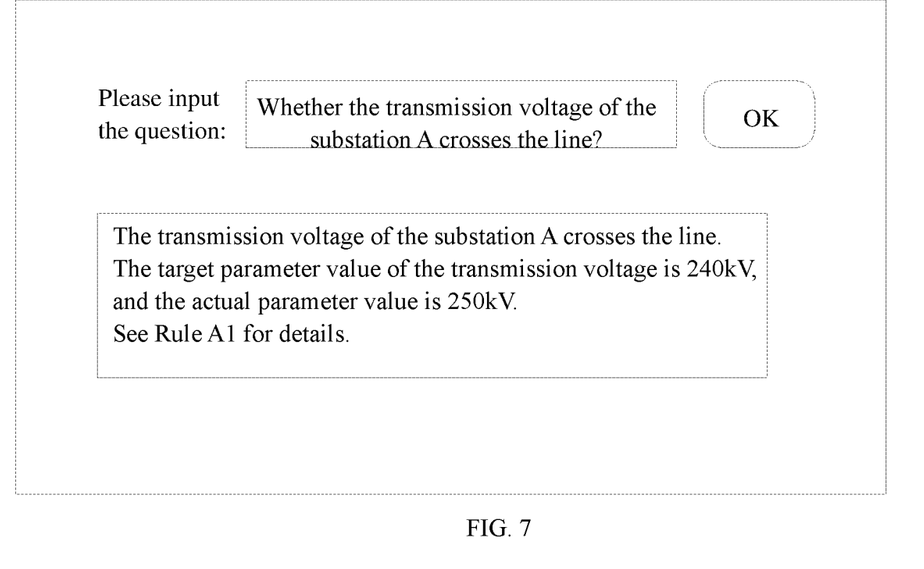
FIG. 7 shows a schematic diagram of another display interface provided by embodiments of the present disclosure.

As an example, FIG. 7 shows a schematic diagram of another display interface provided by embodiments of the present disclosure. As shown in FIG. 7, in this example, the electronic device not only displays the answer information "The transmission voltage of the substation A crosses the line", but also displays "The target parameter value of the transmission voltage is 240 kV, and the actual parameter value is 250 kV", and also displays "See Rule A1 for details". That is to say, the electronic device not only shows a reasoning result to the user, but also shows the reasoning process, so that the user may obtain more information, and use such information to accurately determine an accuracy of the answer information.

In the above embodiment, the intelligent question answering system needs to use the preset rule base in the power dispatching process. In some possible implementations of the present disclosure, a rule in the preset rule base may be automatically generated by a parameter input by the user through the visual interface.

Figure 8:
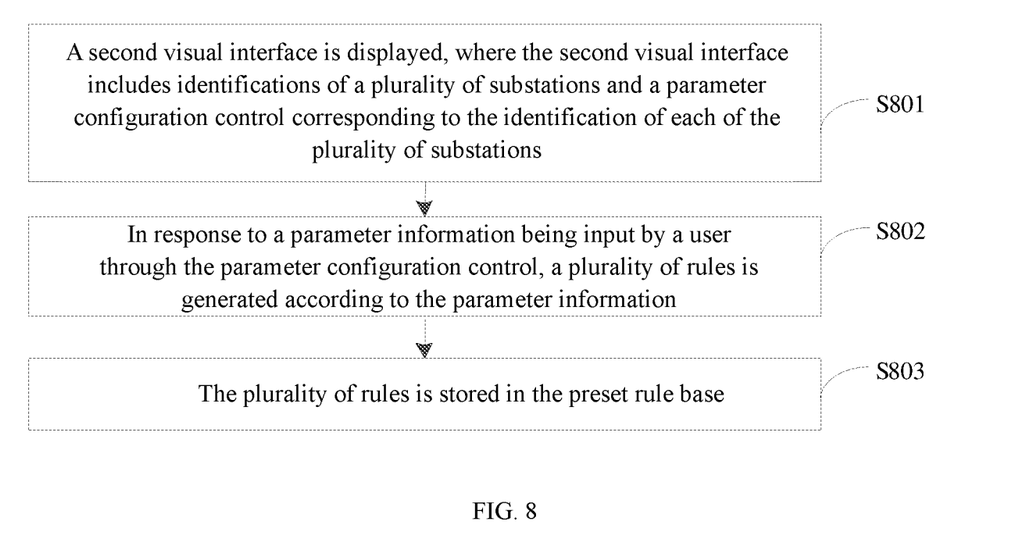
FIG. 8 shows a schematic flowchart of a method of processing a preset rule base provided by embodiments of the present disclosure.

FIG. 8 shows a schematic flowchart of a method of processing a preset rule base provided by embodiments of the present disclosure. As shown in FIG. 8, a method of this embodiment includes operations S801 to S803.

In operation S801, a second visual interface is displayed, where the second visual interface includes identifications of a plurality of substations and a parameter configuration control corresponding to the identification of each of the plurality of substations.

In operation S802, in response to a parameter information being input by a user through the parameter configuration control, a plurality of rules is generated according to the parameter information.

Figure 9:
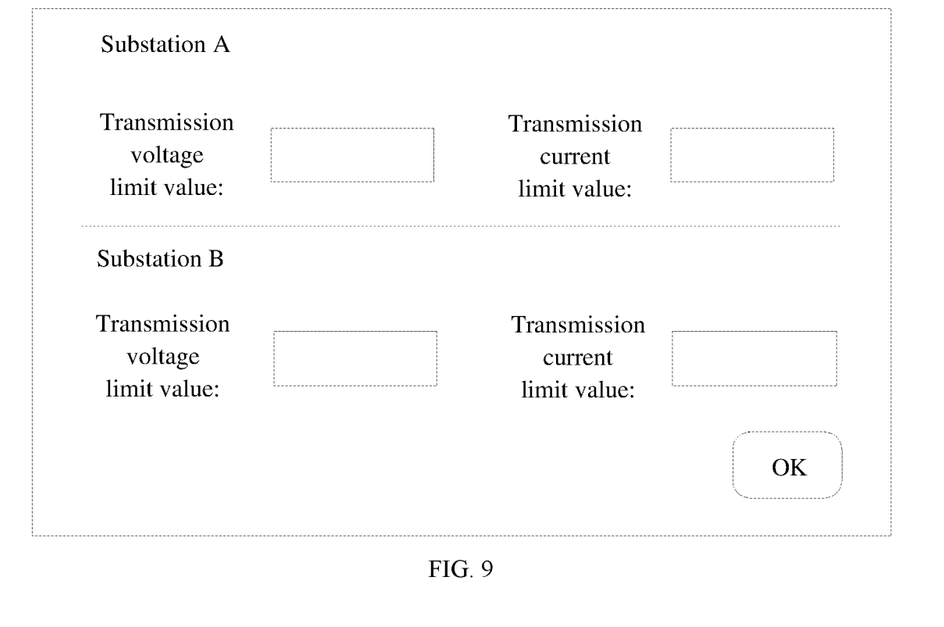
FIG. 9 shows a schematic diagram of another display interface provided by embodiments of the present disclosure.

As an example, FIG. 9 shows a schematic diagram of another display interface provided by embodiments of the present disclosure. As shown in FIG. 9, the second visual interface includes identifications of a plurality of substations and a parameter configuration control corresponding to the identification of each of the plurality of substations. For example, for the substation A, a configuration control corresponding to the transmission voltage and a configuration control corresponding to the transmission current are displayed. The user may input a limit value for the transmission voltage through the configuration control corresponding to the transmission voltage, and input a limit value for the transmission current through the configuration control corresponding to the transmission current. In this way, the electronic device may generate a rule A1 "The limit for the transmission voltage is 240 kV" of the substation A according to the limit value for the transmission voltage (for example, 240 kV) input by the user. Similarly, the electronic device may generate a rule A2 of the substation A according to the limit value for the transmission current input by the user.

It should be understood that the above is illustrated by taking the substation A as an example. For other substations, rules corresponding to other substations may be generated in a similar way.

In operation S803, the plurality of rules is stored in the preset rule base.

The plurality of rules generated above is stored in the preset rule base. In this way, the preset rule base may be used in the power dispatching process shown in FIG. 3 or FIG. 5.

Alternatively, with the passage of time, when a rule of a certain substation changes, the user may also update a parameter information of the substation through the second display interface, so that the rules in the preset rule base may be updated in time to ensure the accuracy of the power dispatching result.

In this embodiment, the user only needs to configure a small amount of parameter information in the visual interface to generate a rule corresponding to the substation, which is convenient for an entry and update of the rule. In addition, there is no need to write a corresponding code for each rule, which reduces a maintenance difficulty of the power dispatching system.

Figure 10:
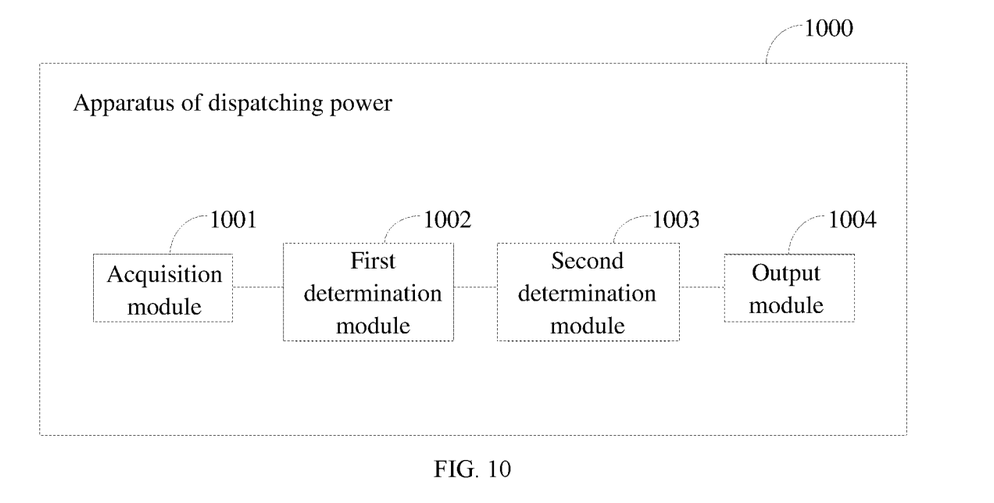
FIG. 10 shows a schematic structural diagram of an apparatus of dispatching power provided by embodiments of the present disclosure.

FIG. 10 shows a structural diagram of an apparatus of dispatching power provided by embodiments of the present disclosure. The apparatus may be in a form of software and/or hardware. As shown in FIG. 10, an apparatus 1000 of dispatching power includes an acquisition module 1001, a first determination module 1002, a second determination module 1003, and an output module 1004.

The acquisition module 1001 is used to acquire a power dispatching question information.

The first determination module 1002 is used to determine a question semantic information corresponding to the power dispatching question information, where the question semantic information includes an identification of a target substation, a question intention, and a target parameter.

The second determination module 1003 is used to determine an answer information according to the question semantic information and a preset rule base, where the answer information is used for a power dispatching of the target substation.

The output module 1004 is used to output the answer information.

In a possible implementation method, the second determination module 1003 includes: a first determination unit used to determine a plurality of first rules from the preset rule base according to the identification of the target substation, where the first rule is a rule to be met by a parameter of the target substation; and a second determination unit used to determine the answer information according to the question intention, the target parameter, and the plurality of first rules.

In a possible implementation method, the second determination unit includes: a first determination sub-unit used to determine at least one second rule from the plurality of first rules according to the target parameter, where the second rule includes the target parameter; and a second determination sub-unit used to determine the answer information according to the question intention, the target parameter, and the at least one second rule.

In a possible implementation method, the second determination sub-unit is specifically used to: determine a target parameter value corresponding to the target parameter and an actual parameter value corresponding to the target parameter according to the question intention, the target parameter, and the at least one second rule; and determine the answer information according to the target parameter value and the actual parameter value.

In a possible implementation method, the second determination sub-unit is specifically used to: determine, in the at least one second rule, the target parameter value corresponding to the target parameter according to the target parameter, in response to the question intention being configured to indicate an inquiry for a current operation state of the target substation; acquire an operation parameter value of at least one power device in the target substation according to the target parameter; and determine the actual parameter value corresponding to the target parameter according to the operation parameter value of the at least one power device.

In a possible implementation method, the second determination sub-unit is specifically used to: in response to the question intention being configured to indicate an inquiry for a dispatching mode of the target substation, extract, from the power dispatching question information, a parameter value according to the target parameter, and determining the extracted parameter value as the target parameter value corresponding to the target parameter; and determine, in the at least one second rule, the actual parameter value corresponding to the target parameter.

In a possible implementation method, the first determination module is specifically used to: process the power dispatching question information through a preset model, so as to obtain the question semantic information, wherein the preset model is obtained by training sample data, and the sample data includes a sample question information and a sample semantic information.

In a possible implementation method, the output module 1004 is specifically used to: display the answer information; or send the answer information to a preset device.

In a possible implementation method, the acquisition module 1001 is specifically used to: display a first visual interface, where the first visual interface includes an input control; and receive the power dispatching question information input by a user through the input control.

In a possible implementation method, the apparatus provided by embodiments further include: a displaying module used to display a second visual interface, where the second visual interface includes identifications of a plurality of substations and a parameter configuration control corresponding to the identification of each of the plurality of substations; a generation module used to in response to a parameter information being input by a user through the parameter configuration control, generate a plurality of rules according to the parameter information; a storage module used to store the plurality of rules in the preset rule base.

The apparatus of dispatching power provided in this embodiment may be used to implement the method of dispatching power provided in any of the above method embodiments. An implementation principle and a technical effect of the apparatus of dispatching power are similar with those of the method of dispatching power, which will not be repeated here.

In the technical solution of the present disclosure, the collection, storage, use, processing, sending, provision, disclosure and application of the question information involved are all in compliance with the relevant laws and regulations, and do not violate the public order and good customs.

According to embodiments of the present disclosure, the present disclosure further provides an electronic device, a readable storage medium, and a computer program product.

According to embodiments of the present disclosure, the present disclosure further provides a computer program product. The computer program product includes a computer program stored in the readable storage medium. At least one processor of the electronic device may read the computer program from the readable storage medium. At least one processor implements the computer program such that the electronic device implements the solution provided by any of the above embodiments.

Figure 11:
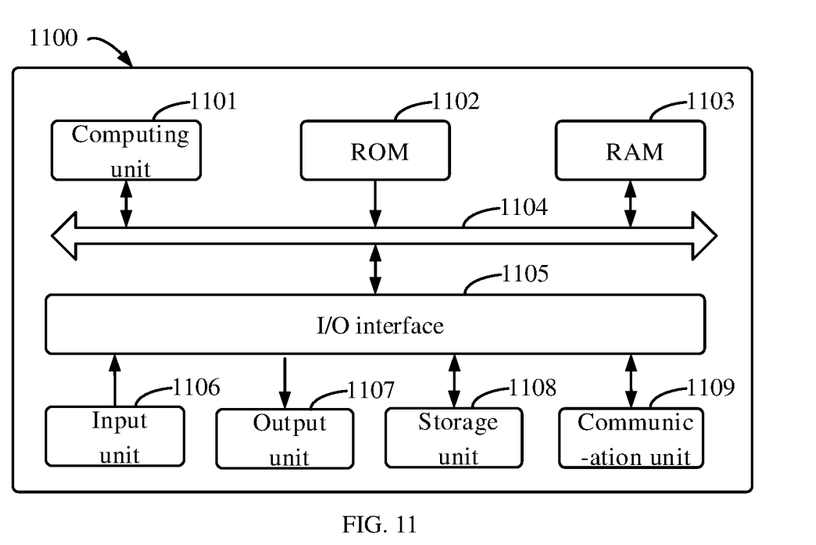
FIG. 11 shows a schematic structural diagram of an electronic device provided by embodiments of the present disclosure.

FIG. 11 shows a schematic block diagram of an exemplary electronic device 1100 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 11, the device 1100 may include a computing unit 1101, which may perform various appropriate actions and processing based on a computer program stored in a read-only memory (ROM) 1102 or a computer program loaded from a storage unit 1108 into a random access memory (RAM) 1103. Various programs and data required for the operation of the device 1100 may be stored in the RAM 1103. The computing unit 1101, the ROM 1102 and the RAM 1103 are connected to each other through a bus 1104. An input/output (I/O) interface 1105 is further connected to the bus 1104.

Various components in the device 1100, including an input unit 1106 such as a keyboard, a mouse, etc., an output unit 1107 such as various types of displays, speakers, etc., a storage unit 1108 such as a magnetic disk, an optical disk, etc., and a communication unit 1109 such as a network card, a modem, a wireless communication transceiver, etc., are connected to the I/O interface 1105. The communication unit 1109 allows the device 1100 to exchange information/data with other devices through a computer network such as the Internet and/or various telecommunication networks.

The computing unit 1101 may be various general-purpose and/or special-purpose processing components with processing and computing capabilities. Some examples of the computing unit 1101 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 1101 may perform the various methods and processes described above, such as the method of dispatching power. For example, in some embodiments, the method of dispatching power may be implemented as a computer software program that is tangibly contained on a machine-readable medium, such as a storage unit 1108. In some embodiments, part or all of a computer program may be loaded and/or installed on the device 1100 via the ROM 1102 and/or the communication unit 1109. When the computer program is loaded into the RAM 1103 and executed by the computing unit 1101, one or more steps of the method of dispatching power described above may be performed. Alternatively, in other embodiments, the computing unit 1101 may be configured to perform the method of dispatching power in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may send the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, also referred to as a cloud computing server or a cloud host, which is a host product in the cloud computing service system to solve shortcomings of difficult management and weak business scalability in conventional physical host and VPS (Virtual Private Server) service. The server may also be a server of a distributed system, or a server combined with a blockchain.

It should be understood that steps of the processes illustrated above may be reordered, added or deleted in various modes. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of dispatching power, the method comprising:
    acquiring, by an intelligent question answering system, a power dispatching question information;
    determining, by the intelligent question answering system, a question semantic information corresponding to the power dispatching question information, wherein the question semantic information comprises an identification of a target substation, a question intention, and a target parameter, and wherein the target substation comprises a plurality of power devices, each of the plurality of power devices is connected with the intelligent question answering system, and the intelligent question answering system is configured to acquire an operation parameter value of each of the plurality of power devices;
    determining an answer information according to the question semantic information and a preset rule base in the intelligent question answering system, the determining an answer information according to the question semantic information and a preset rule base comprises:
        determining a plurality of first rules from the preset rule base according to the identification of the target substation, wherein the first rule is a rule to be met by a parameter of the target substation; and
        determining the answer information according to the question intention, the target parameter, and the plurality of first rules, wherein the determining the answer information according to the question intention, the target parameter, and the plurality of first rules comprises:
            determining at least one second rule from the plurality of first rules according to the target parameter, wherein the second rule comprises the target parameter; and
            determining the answer information according to the question intention, the target parameter, and the at least one second rule, wherein the determining the answer information according to the question intention, the target parameter, and the at least one second rule comprises:
                determining a target parameter value corresponding to the target parameter and an actual parameter value corresponding to the target parameter according to the question intention, the target parameter, and the at least one second rule; and
                determining the answer information according to the target parameter value and the actual parameter value; and
    controlling a power dispatching of the target substation based on the answer information.

2. The method according to claim 1, wherein the determining a target parameter value corresponding to the target parameter and an actual parameter value corresponding to the target parameter according to the question intention, the target parameter, and the at least one second rule comprises:
    determining, in the at least one second rule, the target parameter value corresponding to the target parameter according to the target parameter, in response to the question intention being configured to indicate an inquiry for a current operation state of the target substation;
    acquiring the operation parameter value of at least one power device of the plurality of power devices in the target substation according to the target parameter; and
    determining the actual parameter value corresponding to the target parameter according to the operation parameter value of the at least one power device of the plurality of power devices.

3. The method according to claim 1, wherein the determining a target parameter value corresponding to the target parameter and an actual parameter value corresponding to the target parameter according to the question intention, the target parameter, and the at least one second rule comprises:

in response to the question intention being configured to indicate an inquiry for a dispatching mode of the target substation,
    extracting, from the power dispatching question information, a parameter value according to the target parameter, and determining the extracted parameter value as the target parameter value corresponding to the target parameter; and
    determining, in the at least one second rule, the actual parameter value corresponding to the target parameter.

4. The method according to claim 1, wherein the determining a question semantic information corresponding to the power dispatching question information comprises processing the power dispatching question information through a preset model in the intelligent question answering system, so as to obtain the question semantic information, wherein the preset model is obtained by training sample data, and the sample data comprises a sample question information and a sample semantic information.

5. The method according to claim 1, wherein the outputting the answer information comprises:
    displaying the answer information; or
    sending the answer information to a preset device.

6. The method according to claim 1, wherein the acquiring a power dispatching question information comprises:
    displaying a first visual interface, wherein the first visual interface comprises an input control; and
    receiving, through the input control, the power dispatching question information input by a user.

7. The method according to claim 1, further comprising:
    displaying a second visual interface, wherein the second visual interface comprises identifications of a plurality of substations and a parameter configuration control corresponding to the identification of each of the plurality of substations;
    in response to a parameter information being input by a user through the parameter configuration control, generating a plurality of rules according to the parameter information; and
    storing the plurality of rules in the preset rule base.

8. An electronic device, comprising:
    at least one processor; and
    a memory communicatively connected to the at least one processor, wherein the memory stores instructions executable by the at least one processor, the instructions, when executed by the at least one processor, are configured to cause the at least one processor to at least implement the method of claim 1.

9. A non-transitory computer-readable storage medium having computer instructions therein, the computer instructions are configured to cause a computer system to at least implement the method of claim 1.

10. An electronic device, comprising:
    at least one processor; and
    a memory communicatively connected to the at least one processor, wherein the memory stores instructions executable by the at least one processor, the instructions, when executed by the at least one processor, are configured to cause the at least one processor to at least:
    acquire a power dispatching question information;
    determine, by an intelligent question answering system, a question semantic information corresponding to the power dispatching question information, wherein the question semantic information comprises an identification of a target substation, a question intention, and a target parameter, and wherein the target substation comprises a plurality of power devices, each of the plurality of power devices is connected with the intelligent question answering system, and the intelligent question answering system is configured to acquire an operation parameter value of each of the plurality of power devices;
    determine an answer information according to the question semantic information and a preset rule base in the intelligent question answering system, the determination of an answer information according to the question semantic information and a preset rule base comprises:
        determination of a plurality of first rules from the preset rule base according to the identification of the target substation, wherein the first rule is a rule to be met by a parameter of the target substation; and
        determination of the answer information according to the question intention, the target parameter, and the plurality of first rules, wherein the determination of the answer information according to the question intention, the target parameter, and the plurality of first rules comprises:
            determination of at least one second rule from the plurality of first rules according to the target parameter, wherein the second rule comprises the target parameter; and
            determination of the answer information according to the question intention, the target parameter, and the at least one second rule, wherein the determination of the answer information according to the question intention, the target parameter, and the at least one second rule comprises:
                determination of a target parameter value corresponding to the target parameter and an actual parameter value corresponding to the target parameter according to the question intention, the target parameter, and the at least one second rule; and
                determination of the answer information according to the target parameter value and the actual parameter value; and
    cause control of a power dispatching of the target substation based on the answer information.

11. The electronic device according to claim 10, wherein the instructions are further configured to cause the at least one processor to at least:
    determine, in the at least one second rule, the target parameter value corresponding to the target parameter according to the target parameter, in response to the question intention being configured to indicate an inquiry for a current operation state of the target substation;
    acquire the operation parameter value of at least one power device of the plurality of power devices in the target substation according to the target parameter; and
    determine the actual parameter value corresponding to the target parameter according to the operation parameter value of the at least one power device of the plurality of power devices.

12. The electronic device according to claim 10, wherein the instructions are further configured to cause the at least one processor to at least:
    in response to the question intention being configured to indicate an inquiry for a dispatching mode of the target substation,
        extract, from the power dispatching question information, a parameter value according to the target parameter, and determine the extracted parameter value as the target parameter value corresponding to the target parameter; and determine, in the at least one second rule, the actual parameter value corresponding to the target parameter.

13. The electronic device according to claim 10, wherein the instructions are further configured to cause the at least one processor to at least process the power dispatching question information through a preset model in the intelligent question answering system, so as to obtain the question semantic information, wherein the preset model is obtained by training sample data, and the sample data comprises a sample question information and a sample semantic information.

14. The electronic device according to claim 10, wherein the instructions are further configured to cause the at least one processor to at least:

display the answer information; or send the answer information to a preset device.

15. The electronic device according to claim 10, wherein the instructions are further configured to cause the at least one processor to at least:

display a first visual interface, wherein the first visual interface comprises an input control; and receive, through the input control, the power dispatching question information input by a user.

16. A non-transitory computer-readable storage medium having computer instructions therein, the computer instructions are configured to cause a computer system to at least:

acquire a power dispatching question information;

determine, by an intelligent question answering system, a question semantic information corresponding to the power dispatching question information, wherein the question semantic information comprises an identification of a target substation, a question intention, and a target parameter, and wherein the target substation comprises a plurality of power devices, each of the plurality of power devices is connected with the intelligent question answering system, and the intelligent question answering system is configured to acquire an operation parameter value of each of the plurality of power devices;

determine an answer information according to the question semantic information and a preset rule base in the intelligent question answering system, the determination of an answer information according to the question semantic information and a preset rule base comprises:

determination of a plurality of first rules from the preset rule base according to the identification of the target substation, wherein the first rule is a rule to be met by a parameter of the target substation; and determination of the answer information according to the question intention, the target parameter, and the plurality of first rules, wherein the determination of the answer information according to the question intention, the target parameter, and the plurality of first rules comprises:

determination of at least one second rule from the plurality of first rules according to the target parameter, wherein the second rule comprises the target parameter; and determination of the answer information according to the question intention, the target parameter, and the at least one second rule, wherein the determination of the answer information according to the question intention, the target parameter, and the at least one second rule comprises:

determination of a target parameter value corresponding to the target parameter and an actual parameter value corresponding to the target parameter according to the question intention, the target parameter, and the at least one second rule; and determination of the answer information according to the target parameter value and the actual parameter value; and cause control of a power dispatching of the target substation based on the answer information.

17. The non-transitory computer-readable storage medium according to claim 16, wherein the instructions are further configured to cause the computer system to at least:

determine, in the at least one second rule, the target parameter value corresponding to the target parameter according to the target parameter, in response to the question intention being configured to indicate an inquiry for a current operation state of the target substation;

acquire the operation parameter value of at least one power device of the plurality of power devices in the target substation according to the target parameter; and determine the actual parameter value corresponding to the target parameter according to the operation parameter value of the at least one power device of the plurality of power devices.

18. The non-transitory computer-readable storage medium according to claim 16, wherein the instructions are further configured to cause the computer system to at least:

in response to the question intention being configured to indicate an inquiry for a dispatching mode of the target substation, extract, from the power dispatching question information, a parameter value according to the target parameter, and determine the extracted parameter value as the target parameter value corresponding to the target parameter; and determine, in the at least one second rule, the actual parameter value corresponding to the target parameter.

19. The non-transitory computer-readable storage medium according to claim 16, wherein the instructions are further configured to cause the computer system to at least process the power dispatching question information through a preset model in the intelligent question answering system, so as to obtain the question semantic information, wherein the preset model is obtained by training sample data, and the sample data comprises a sample question information and a sample semantic information.

20. The non-transitory computer-readable storage medium according to claim 16, wherein the instructions are further configured to cause the computer system to at least:

display a first visual interface, wherein the first visual interface comprises an input control; and receive, through the input control, the power dispatching question information input by a user.

* * * * *